United States Patent [19]

Epstein

[11] Patent Number: 4,675,538
[45] Date of Patent: Jun. 23, 1987

[54] GENERAL PURPOSE UNINTERRUPTIBLE POWER SUPPLY

[76] Inventor: Barry M. Epstein, 7523 Cliffbrook, Dallas, Tex. 75240

[21] Appl. No.: 869,701

[22] Filed: Jun. 2, 1986

[51] Int. Cl.⁴ .............................................. H02J 9/00
[52] U.S. Cl. ...................................... 307/64; 307/66; 307/150; 364/415
[58] Field of Search ................... 307/64, 66, 149, 150; 361/412, 499, 413, 414, 415, 416, 417, 406, 407, 394, 380, 392, 393, 395; 323/238, 326, 321, 901; 363/147

[56] References Cited

U.S. PATENT DOCUMENTS

| | | | |
|---|---|---|---|
| 3,327,173 | 6/1967 | Thompson | 361/419 |
| 3,368,117 | 2/1968 | Pond et al. | 361/415 |
| 3,573,483 | 4/1971 | White | 307/66 |
| 3,605,002 | 9/1971 | Smyth | 307/150 X |
| 3,757,131 | 9/1973 | Krutz et al. | 307/66 X |
| 3,778,634 | 12/1973 | Hanrihan | 307/64 |
| 4,106,076 | 8/1978 | Miller et al. | 361/407 X |
| 4,167,680 | 9/1979 | Gross | 307/66 |
| 4,217,624 | 8/1980 | Tuck | 361/394 |
| 4,262,214 | 4/1981 | Patel | 361/92 X |
| 4,327,298 | 4/1982 | Burgin | 307/66 |
| 4,388,706 | 6/1983 | Butler | 307/64 X |
| 4,399,396 | 8/1983 | Hase | 307/66 X |
| 4,401,351 | 8/1983 | Record | 361/415 X |
| 4,426,587 | 1/1984 | Nouet | 307/150 X |
| 4,451,742 | 5/1984 | Aswell | 307/66 |
| 4,514,786 | 4/1985 | Charruau | 361/415 X |
| 4,517,470 | 5/1985 | Cheffer | 307/64 |
| 4,556,802 | 12/1985 | Harada et al. | 307/66 |
| 4,564,767 | 1/1986 | Charych | 307/66 |
| 4,595,872 | 6/1986 | Ball | 307/66 X |

Primary Examiner—Charles D. Miller
Assistant Examiner—Shik Luen Paul Ip
Attorney, Agent, or Firm—Terry M. Gernstein

[57] ABSTRACT

An uninterruptible power supply (10) includes a backup power supply (50) mounted on a circuit board type base (30) and connected to a universal buss (40) which is also mounted on the base to be in parallel with a main power supply which is also connected to the universal buss. A plurality of voltage controllers (60) are also mounted on the circuit board and each connects the universal buss to an output terminal (64) whereby a plurality of different elements can be connected to the uninterruptible power supply and each element can have a voltage requirement which is different from the voltage requirements of the other elements. A signal control (96) is also included to visually, audibly and/or digitally indicate impending run-out of battery power.

26 Claims, 8 Drawing Figures

GENERAL PURPOSE UNINTERRUPTIBLE POWER SUPPLY

TECHNICAL FIELD

The present invention relates generally to devices for maintaining a continuous supply of electrical energy to loads, and is more particularly concerned with the continuous supply of electrical energy to loads, such as computers, data processing systems, laboratory equipment or the like for which the power supplied has to be maintained or guaranteed at all times during operation of the load and not vary appreciably or at all as commercial AC power is lost or returns. Specifically, the invention is concerned with supplying uninterrupted power to a plurality of loads, each of which may have an individual power requirement, taking into consideration the parameters of common commercial power lines.

BACKGROUND ART

A substantial portion of modern-day technology depends for its operating power on commercially supplied AC power sources, and a significant number of electronic systems require extremely reliable sources of power. Examples of electronic systems needing reliable power include computers, data processors, process controllers, and communications and laboratory equipment.

In general, the available commercial power supplied by utilities arriving at the user's location (i.e., wall plug) is not sufficiently reliable to meet the power needs of such equipment. Commerical power is sometimes subject to complete outages, or in other words, complete failure at the power source, these conditions being known as blackouts. More often, due to inadequate capacity and increasing load demands, commercial power is subject to a condition known as "brownout", sags which normally occur during peak demand periods and usually are typically represented by a 3% to 8% drop in magnitude of the available voltage. Commerical power is very frequently subject to magnitude and reactive instabilities causing irregular voltage waveforms due to transients induced by the action of various customers who subject the system to sudden electrical loads, power line switching equipment, or nearby high frequency "noise" generating equipment such as the motors of small appliances or hand tools, arc producing equipment such as fluorescent lights or switching-type DC power supplies. Power may be lost or flicker due to storms, accidents, or utility switching.

Power level variations such as described above can significantly affect equipment, and may, in some instances, damage that equipment. For example, in communication circuitry, even a transient interruption or surge may cause undetected errors in data or control signals or cause damage that is not readily detectable or obvious. Specifically, to operate properly, a computer requires a precisely regulated, continuous power signal. The fluctuations it can tolerate from a power source are extremely limited. The computer can probably tolerate momentary spikes and dips in the voltage if the duration is only a few milliseconds. It can probably also tolerate a slight brownout for a short period of time such as 3-100 milliseconds. Should a voltage drop last beyond a certain period, it is possible that the computer could malfunction or shut down. In certain instances, there is a very definite possibility that processing errors may occur requiring partial program reruns. In instances of severe brownout or drop out, the computer may go into total shutdown and may terminate operations with a possibility of component damage and/or adverse effects on the integrity of the stored data and program. There are also a large number of separate occurrences where very large voltage transients may appear on the line, on any combinations of phase conductors, neutral, and/or ground.

It is, therefore, apparent that for safe, reliable operation a computer needs a source of continuous, regulated power having very stable characteristics. Since the power normally available at the user's location does not possess the necessary stability and lack of transients for safe operation of computers, it is customary to supply the power to computers with uninterruptible power supplies which are essentially external to the computer. Uninterruptible power supplies guarantee the continuity of power regardless of the performance of the primary commercial AC power source upon which a customer relies. Generally, uninterruptible power supplies include plural sources of power which usually operate in conjunction with each other to provide a continuous power output to some load to be energized. The plural sources generally include a commercial AC power source and an auxiliary independent source of power to supplement or substitute for the commercial AC power as required in order to supply the necessary continuous and stable power input to the load to be energized.

There are several methods of providing an uninterruptible power supply. One simple method is to connect a charger and rectifier to the commercial AC power source. The rectified output is connected in parallel with a reserve battery-type power source and both sources are used to drive an inverter circuit from which the power signal to energize the computer is derived. This power supply arrangement is complex and inefficient due to the need to output an alternating current. It is also inefficient and cumbersome to regenerate an alternating current (usually 60 cps) which is subsequently again converted to direct current. Furthermore, there is usually no redundancy to provide power to the load should the inverter fail. It is generally recognized that inverters are fairly reliable, but they are generally incapable of handling rapid load change demands which generally result in overcurrent, short circuits, or in-rush current conditions. A rapid load transfer can create signal disturbances which will destroy the inverter or interfere with operation of the computer components.

To avoid these problems, uninterruptible power supplies have been designed where the primary commercial power source and the reserve power source are connected in parallel. Both the primary power source and the reserve power source are continuously operated and both sources contribute to the energization of the load. This is a completely redundant system and should either power source fail, the results are not apparent to the load which is continuously energized. Such an uninterruptible power supply system may use a ferroresonant transformer with two input primaries which are coupled to energize a single secondary. Through the use of properly designed high reluctance shunts, the two power sources do not transmit power to each other. Both power sources cooperate to share the load's power needs. The disadvantage of this particular arrangement is the expensive transformer design of a ferroresonant transformer having carefully designed high reluctance shunts and symmetrical construction to permit the two power sources to share the load. Both of the above-described systems are also rendered somewhat inefficient and unduly complex on an overall system basis because of the regeneration of an (60 cps) alternating current.

Another form of the just-discussed parallel power source design includes batteries connected in parallel using a diode matching system. In such a system diodes are used to prevent the output current of one of the power sources from flowing into the other of the power sources when the output voltage of one of the power sources is greater than that of the other.

In the case where two power sources are operated in parallel as described above, the power source which has a greater output voltage supplies substantially 100% of the load current. Under this condition, should the other power source be deactivated, the load is not affected because the first-mentioned power source still supplies output current to the load. On the other hand, should the first-mentioned power source be deactivated, the other power source starts supply current to the load. Thus, in both cases, the load is constantaly supplied with load current.

As is clear from the above description, the parallel power source diode matching system is advantageous in that the number of components required is relatively small and accordingly the arrangement is simple. However, the operation of the parallel power source diode matching system has been disadvantageous for the following reasons:

(1) In practice, the difference between the output voltages of the parallel power sources will never become zero. Therefore, it is difficult to maintain load balance between the power sources; that is, the load current is always supplied by only one of the power sources. Accordingly, the temperature of the power source supplying the load current increases, such that the power source itself (and accordingly the power source system) is degraded in reliability. Since the reliability of the power source to be parallel-operated is increased, the reliability of the system is not improved.

(2) In the case where the parallel operation is carried out in order to increase the output capacity, the load balance is not sufficient to maintain both power sources in their conductive states. As a result, the load current is supplied by only one of the power sources, and it becomes necessary to increase the capacity of the transistor which forms the power source. Thus, it is impossible to decrease the capacity of the transistor by employing an overcurrent protection system which provides a particularly beneficial output voltage vs. load current characteristic for the power source.

(3) The load balance is insufficient (as described herein). Therefore, when the power sources switch such that a source which was previously non-conductive is rendered conductive, the output voltage drops significantly during the switch.

(4) Because of the characteristics of the matching diodes, the output voltage depends upon either the load current or the ambient temperature; that is, it is difficult to maintain the output voltage at a constant level with a high degree of accuracy.

An uninterruptible power supply arrangement which permits use of a less expensive power coupling arrangement is commonly known as the "transfer type" of uninterruptible power supply. Generally, a commercial AC line power source and a DC voltage energized inverter power source are connected in parallel to a switching mechanism which alternately couples one or the other of the two power supplies to a load to be energized. This power supply design advantageously eliminates the need for an expensive ferroresonant transformer and provides redundancy to provide a substantially uninterruptible power to the load. In addition, the auxiliary power source comprising the inverter should be synchronized in frequency with the AC power line signal which requires complicated synchronizing circuitry or else high frequency transients may result. The switching action must be sufficiently fast to handle the transition of a load from a failed AC power line to the reserve power source or inverter circuit without inducing damaging transient signals into the circuit. Because the power switch must commutate a large amount of current, its switching time is relatively slow in comparison to the electronic circuitry to which it is supplying power. In addition, the complexity of such a power switch also makes it fairly expensive. This system suffers from still another problem in that the reliability of the entire system is based in part on a single power switch. In fact, the reliability of a single power supply is traded for the reliability of a single power switch. The switching must disconnect the failed power source so it does not become a load for the active power source. Additionally, should the inverter fail, it would only be discovered at the time it is needed most, i.e., at the moment of a power transfer.

In yet another uninterruptible energy system, an energy store is provided between the load and the normal energy supply system. This store receives energy from the main supply system and gives it up to the loads during normal opeation, i.e., so that in effect, the store can be regarded as the energy supply for the load at all times, bur normally the store itself is being replenished by the main supply. If the main supply fails, the store can nevertheless maintain the supply of energy to the load (until, of course, the main supply has been out of action for so long at any one time that the store becomes empty). Due to this "interposition" of energy sources, the loads are sometimes considered completely independent of any disturbances, e.g., voltage reductions or voltage rises, and distortion, emanating from the main energy supply system. However, normal mode (transformer) coupling and triggered static bypass switches may still pass power line disturbances to the load. A great disadvantage of such systems is their low efficiency, so that the cost of supplying energy to complicated loads is enormously increased.

A further problem with uninterruptible power supplies arises when the system being powered requires many different power levels. Heretofore, it has been thought that direct connection of the power supply load to a battery of appropriate voltage was too inefficient to be feasible. It was further thought that battery power is not acceptable because systems such as control instrumentation require a highly regulated power supply.

Accordingly, battery backup systems have been proposed which provide individual battery backup circuits for each subcircuit in a complex system as found in a computer. An example of such multiple backup system arrangement is disclosed by Graf et al in U.S. Pat. No. 4,143,283. Graf et al disclose essentially four independent circuits, one for each voltage used by the device, and use relays to switch batteries from parallel to series as needed for each voltage. User intervention is required to suspend functions, which is undesirable. Furthermore, redesign, repair, or the like are very difficult and expensive with a system which uses separate backup circuits for each voltage level used in the device. Still further, a Graf, et al type device may require a plurality of expensive transformers.

Thus, in addition to the problems associated with uninterruptible power suppies due to their designs, such supplies have other drawbacks when used in conjunction with systems having a plurality of different voltage levels.

For these reasons, uninterruptible power supplies using batteries, even parallel connected batteries, have not been thought suitable for systems in which a variety of voltages are required.

It is also desirable to provide an uninterruptible power supply which is a general purpose device. That is, it is desirable for one uninterruptible power supply to be adaptable to a wide variety of uses, by a wide variety of users, especially where DC current is the desired current to ultimately power the solid state electronics. By attempting to apply a single uninterruptible power supply to a general use, all of the above-discussed problems and drawbacks associated with such devices are exacerbated. In addition to this, such a goal creates further problems as such a device should be as easy to use as possible to the largest number of people possible can use it; therefore, such a device should not have complex controls, nor should it have complicated control signals. It should also be modular to be easily installed in and removed from a wide variety of devices without requiring substantial modification of equipment. Such a general purpose device should also be designed so as to place as few restrictions as possible on the loads it is used with.

Furthermore, the general purpose device should be amenable for use directly with a variety of loads, and should be amenable to mass production. In order to be economical to produce and use, such a system should be battery operated so that heretofore known battery backup power systems are not suitable for such use due to the problems discussed above in connection with battery systems. Still further, the battery of such a general purpose system should be rechargeable and amenable to being rapidly recharged when it is in a standby mode. Additionally, such a battery should be easily replaceable, even while the system is running, if desired.

So that an operator of the protected device will know when the reserve power supply is standing by or when it is providing power, it is necessary to include means within the uninterruptible power supply unit whereby audible and/or visual signals can be generated. It is also desirable to provide a low or out of battery power signal whereby an operator is warned that the backup power supply is low or exhausted and/or automatic action is taken either when reserve power is low or exhausted.

At present in the design of computers the emphasis often lies on busses for (DC) power between the various units of the system. This is because a buss is a very attractive proposition for the designers of computers in view of the large number of peripheral units that can be connected thereto, the designer thus also having a freedom in choosing the desired configuration. Such a buss permits a high flexibility in the design of the system. One of the possibilities of such a system includes the parallel connection of all peripheral units to the said buss, each of these peripheral units being connectable to any other unit.

The use of a buss appears to be appropriate to produce a general purpose uninterruptible power supply in which a variety of loads are protected. Furthermore, using a circuit board concept, such as disclosed in patents such as U.S. Pat. No. 4,151,580 and others, a modular uninterruptible power supply could be provided. However, the above-discussed problems associated with uninterruptible power supplies, and especially those problems associated with uninterruptible power supplies using batteries, have prevented the adaptation of a buss concept to an uninterruptible power supply which is modular and capable of wide, general use.

DISCLOSURE OF THE INVENTION

It is a main object of the present invention to provide a general purpose uninterruptible power supply.

It is another object of the present invention to provide a general purpose uninterruptible power supply which is modular and uses batteries to ensure an uninterrupted source of power.

It is another object of the present invention to provide a general purpose uninterruptible power supply which uses batteries and a buss and is capable of use with a plurality of loads each of which can have a voltage level requirement which differs from the other loads connected to the buss.

It is another object of the present invention to provide a general purpose uninterruptible power supply in which some of the output loads may include alternating current.

It is another object of the present invention to provide a general purpose uninterruptible power supply which generates a signal associated with a low backup battery power condition to permit emergency action to be taken.

It is another object of the present invention to provide a general purpose uninterruptible power supply which is not susceptible to generating a false alarm or other output disturbance due to momentary flickers.

It is another object of the present invention to provide a general purpose uninterruptible power supply which provides for orderly shutdown of systems associated with the power supply in the event the backup power supply may become exhausted.

It is another object of the present invention to provide a general purpose uninterruptible power supply which can shift from one backup battery to another or to have one battery charged while another is operational.

DETAILED DESCRIPTION OF A PREFERRED EMBODIMENT

Figure 1:
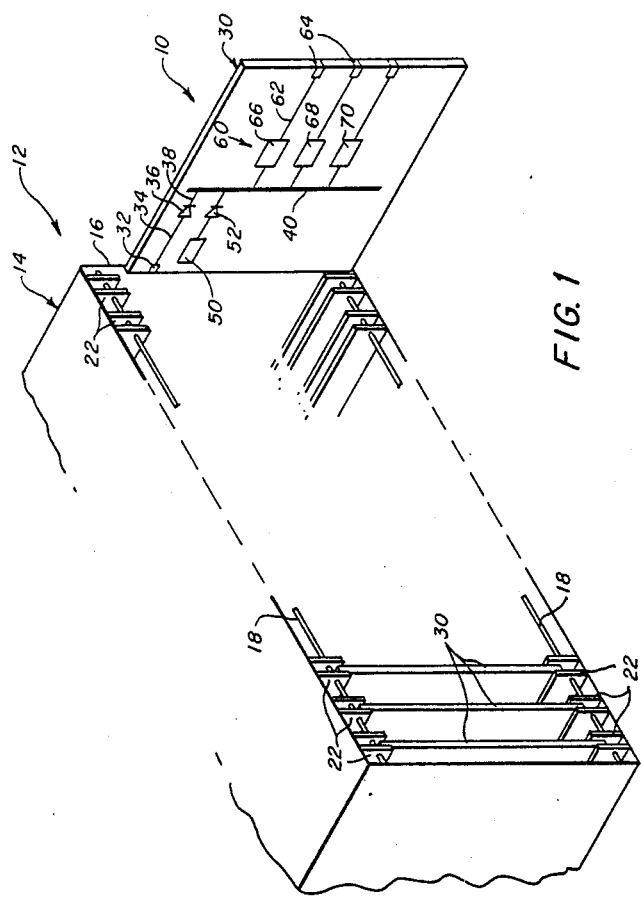
FIG. 1 is a perspective view with the parts cut away of a circuit board assembly in conjunction with a curcuit board mounted uninterruptible power supply embodying the present invention.

Shown in FIG. 1 is a general purpose uninterruptible power supply 10 embodying the teaching of the present invention. The power supply 10 is shown in conjunction with a rack 12 in a circuit board assembly; however, many other devices are amenable for use with the power supply 10 and the rack embodiment is shown as an example of such uses, with no limitation being intended. The rack 12 is shown schematically, and a full disclosure of such a rack can be found in patents such as U.S. Pat. No. 4,151,580 or the like. Furthermore, the power supply board can be mounted separately, if suitable.

The rack includes a frame having sidewalls, such as sidewall 16 fastened together by support rods 18. The support rods are parallel to each other and a set of guide rails 22 connect to these support rods. Each of the guide rails has a slot which receives an edge of a circuit board. Circuit boards are generally rectangular and have a back edge connectable to a mother board on the back side of the frame.

The power supply 10 is mounted on a circuit board 30 and has a main power connection means 32 which connects to a main power supply, such as commercial power provided by a utility. A lead 34 connects the main power connection means to the anode of a diode 36 and a lead 38 connects the cathode of the diode 36 to a universal buss, also known as an intermediate rail. Preferably, DC power is connected to the buss 40; therefore, an appropriate converter could be interposed between connection means 32 and diode 36, if suitable. In practice, it is preferable to use a switching supply with controls such as: soft start (to avoid a damaging high initial current because of capacitors not being charged), shutdown current limit protection (to avoid damage if a short circuit occurs on the output), as well as other controls which may be necessary. A battery 50 is shown as being mounted on the circuit board 30 and is connected to the anode of a diode 52 which has its cathode connected to the universal buss so that the battery 50 is in parallel with the main power source. Diodes 36 and 52 are oriented to prevent undesired coupling of the main power sources and the battery. However, the main battery can be separate from the board if suitable. Batteries such as car batteries are suitable.

The close coupling (or direct coupling) of battery 50 to the buss 40 further means that the battery is always available on an instantaneous basis to take over and help with voltage regulation even for short dips. There is no need of complex switching logic to batteries, and thus there is little or no possibility of a momentary outage or spike that most computer systems cannot tolerate. In system 10, there is no switch time in the output. The battery also helps provide stability under dynamic conditions of very heavy load (such as disc starting, or the like) regardless of good input power or sags occurring at the same time.

A plurality of voltage control means 60 are mounted on circuit board 30 and are connected in parallel to the universal buss and to output terminals, such as output terminal 64 located along the front edge of the circuit board 30 for connection to a plurality of devices by leads, such as leads 62. These voltage control means can include voltage regulators, such as voltage regulator 66, switching power supply 68, a combination thereof, or DC to AC converters, such as indicated at element 70. The output terminals can be DC or AC as suitable and can be in a variety of forms and are, therefore, shown in FIG. 1 only schematically.

The voltage regulators and voltage switching devices being connected in parallel to a universal buss permit power supply 10 to provide a plurarity of regulated, or controlled voltages using a system in which a battery is connected in parallel with the main power supply. The problems of the prior art are overcome, and the universal buss and circuit board mounting permit the power supply 10 to be a general purpose unit.

Figure 2:
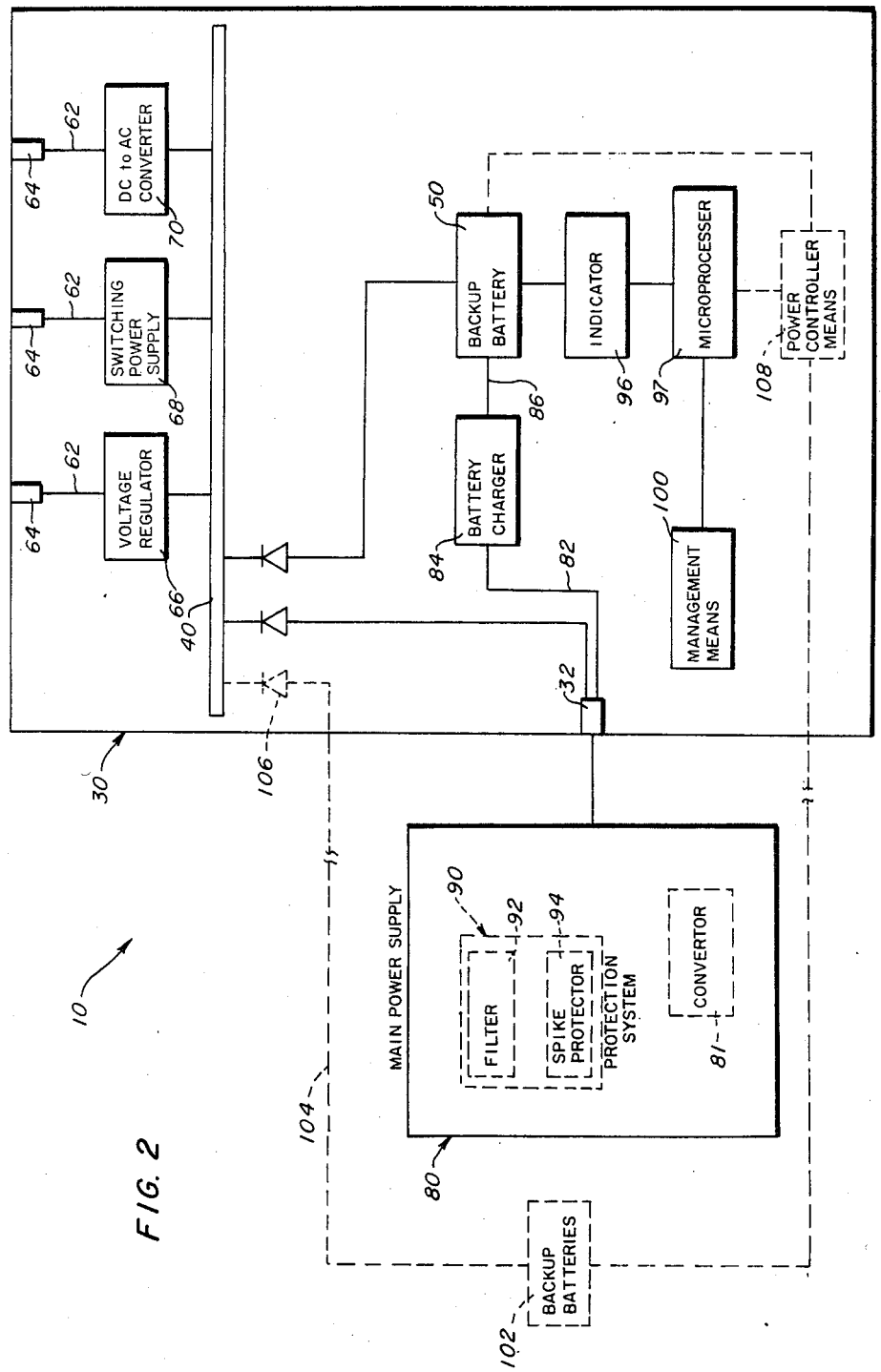
FIG. 2 is a schematic wiring diagram of an uninterruptible power supply embodying the present invention.

Shown in FIG. 2 is a schematic wiring diagram of the uninterruptible power supply. As shown in FIG. 2, the universal buss 40 is connected to a main power supply, as represented by element 80. A converter 81 can be included in element 80, along with suitable surge and spike protectors. The converter 81 can be AC/DC or DC/DC as suitable. a lead 82 connects the main power supply to an optional battery charger 84 which is connected via lead 86 to the backup battery 50 whereby the backup battery can be charged when it is in a standby mode. A further protection system 90 can be used in conjunction with the main power supply if suitable. This further protection system can include a filter 92 and a surge and spike protector 94, such as a POWER SIFTOR (TM), or the like. An indicator element 96 is also connected to the backup battery to indicate various low power conditions, or an out-of power power condition for the backup battery, or a loss of AC power. Such an indicator is especially useful if a low power condition might endanger data stored in a computer memory associated with the output terminals. The indicator can include a microprocessor 97 to control the signal, and the signal can be digital, visible, audible, of a combination thereof.

The digital low battery signal can be used to trigger automatic data storage after completion of current tasks. Timing of the signal from a defined low battery condition (or similar) is optimum to generate the signal and to avoid false alarms from momentary flickers.

The microprocessor 97 can include a management means 100 which can include software for carrying out a variety of functions. For example, the microprocessor can control the indicator element 96 to prevent false alarms due to momentary flickers, or the like, so that alarm is activated only for a low battery power condition. Additionally, the microprocessor can control overall operation of the unit 10 whereby an orderly shutdown thereof occurs as the low battery power situation occurs. Thus, for example, each system associated with the unit 10 may be assigned a priority and the systems shut down according to a predetermined hierarchy, with any data in each system being stored prior to shutdown of that unit. The manner of each system shutdown can also be controlled whereby tasks are shut down according to a prescribed sequence. The indicator element can include data storage means to provide a record of the time, manner and order of system shutdown, as well as means for visually and/or audibly displaying such shutdown process. The sequence can include shifting of loads as necessary, initiate or affect a status data transmission to a control point.

There may be situations where the power requirements associated with unit 10 are so large that the backup batteries cannot be mounted directly on the board 30. In such a situation, the backup batteries, indicated by dotted line 102 in FIG. 2, can be located at any suitable location spaced from the board 30 and connected to the buss 40 by a suitable lead 104 having a diode 106 therein, although the diode 106 can be omitted if desired. The unit 10 can also include a power controlled means 108 on the board to shift power supplies from a board-mounted battery, such as battery 50, to such a large battery 102. The batteries of such configuration can be paralleled if suitable. The means 108 can be controlled by a microprocessor.

It is noted that the backup power supply has been disclosed as being batteries, but other elements, such as capacitors, can also be used without departing from the scope of the present disclosure.

Furthermore, the packaging can be modular, i.e., a "primary card", a battery option, various DC output modules, AC inverter modules, output modules or input modules including diesel generators, multiple sources or the like can be used.

Figure 3:
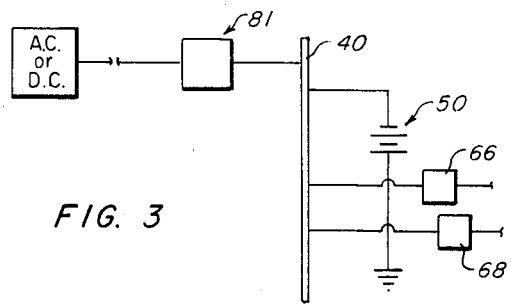
FIG. 3 is a schematic representation of a system using a minimum number of components.

It is also noted that, if the battery 50 is directly connected across the buss 40, in the interest of stability and of reducing the number of components to a minimum, additional requirements are placed on the incoming AC or DC stage. This is indicated in FIG. 3. In the FIG. 3 embodiment, the input stage must me capable of supplying the worst case output DC demands and capable of handling the potential simultaneous case of a totally discharged battery. It is also noted that diode 36 can be omitted.

Figure 4:
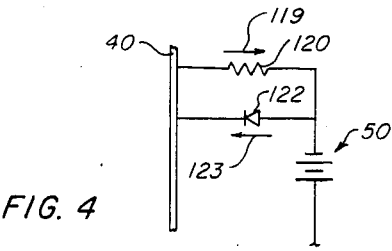
FIGS. 4–6 are schematic representations of circuits in which the maximum charge current is limited.
Figure 5:
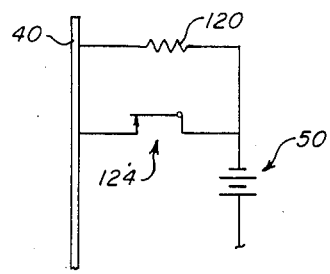
Figure 6:
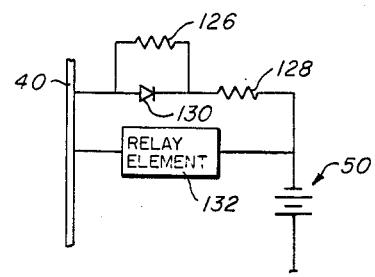

The circuits shown in FIGS. 4, 5 and 6 can be used to accomplish the just-mentioned object in an expeditious manner. The purpose of these circuits is to limit the maximum charge current so that elements of the input stage, fusing, cord, or the like, need not be overly large. Thus, the maximum charge current 119 is limited by a resistor 120 shown in the FIG. 4 circuit to be in series with the battery 50. A diode 122 is located in the run current path to allow full output battery current 123 when needed by the buss 40. The diode 122 is preferably a low loss diode.

The diode 122 can be replaced by a relay contact 124 as shown in FIG. 5. The relay contact is preferably a metallic low loss contact. In the FIG. 5 circuit, once charging has started, the current will drop rapidly. Therefore, after about 10 to 90 seconds of current flow through the limiting resistor, the relay can be closed. This then allows full run current and of course also allows full charge current no longer limited by the resistor. The criteria is to close the relay contacts whenever the charge current rate drops to a low enough value so that the input stage is not overtaxed.

FIG. 6 shows another variation of the above-discussed circuit in which two charge current limiting resistors 126 and 128 are included along with a diode 130. Since every diode has a voltage drop asociated with it, the initial charge current is limited by resistor 126 (assuming that resistor 126 has a higher resistance than does resistor 128). As current flow approaches zero, with the battery becoming fully charged, current flow will then take place through resistor 126 to eventually allow the battery to be fully charged up to the buss voltage. A return path is provided by a diode or relay element 132.

Figure 7:
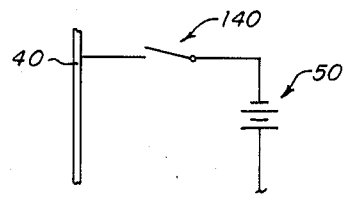
FIG. 7 is a schematic of a circuit in which the backup battery can be turned off.
Figure 8:
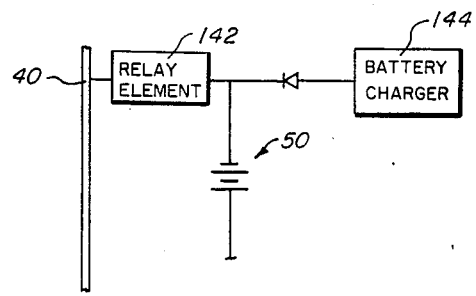
FIG. 8 is a schematic of a circuit in which the backup battery can be charged when the main power supply is shut off.

Shown in FIGS. 7 and 8 is a means for turning the power supply off. This means includes a simple switch 140 in series with the battery curcuit as shown in FIG. 7, or an on/off switch or relay 142 and a separate charger 144 as shown in FIG. 8. The switch 140 can also be a relay and the separate charger 144 allows continued charging of the battery through, for example, a small trickle charger, even though the main power supply is turned off.

INDUSTRIAL APPLICABILITY

The power system 10 is most useful when used with a computer, but can be used in any process which must continue in an uninterrupted manner, such as telephone systems, life support systems, navigation systems, or the like, or in conjunction with many other elements, or with elements such as a CRT, a printer, or the like, or such elements in combination with a computer. An example of one application of the power system is in conjunction with airport radio navigation systems where the electronics are located in a "bunker" on each runway. Still further, a DC to AC converter putting out 120 volts AC can be used with the system whereby equipment, such as a computer, is powered with DC while other equipment, such as a CRT and/or a printer can also be operated. The switching power supplies can switch from buss voltage, which, for example, can be +27 volts dc to outputs such as +12 volts dc, to -12 volts dc, +5 volts dc, +24 volts dc, or the like, or a converter can be used to change the buss voltage to AC or the like. Many other variations and combinations are possible as well. The elements of the power supply can be in the form of a printed circuit, if desirable.

I claim:
1. A backup power system unit comprising:
a circuit board for use in a circuit board rack assembly;
power connection means on said circuit board for coupling the unit to a main power supply;
a universal buss mounted on said circuit board and connected to said power connection means to receive power from said main power supply;
a backup power supply means connected to said circuit board and connected to said universal buss to be in parallel with said main power supply and connected to said universal buss to supply power to said universal buss in an uninterrupted manner;
a plurality of output connection means mounted on said circuit board and connected to said universal buss so that power is supplied to all of said plurality of output connections by said backup power supply means via said universal buss when power from said main power supply is interrupted;
a plurality of voltage controlling means each connected to said universal buss and to one of said output connection means for connecting each of said output connection means to said universal buss to receive power therefrom, each of said voltage controlling means being interposed serially between said universal buss and an associated one of said output connection means for supplying the power received from said universal buss to an element associated with said output connection means via said voltage controlling means whereby a plurality of different elements each having an individual voltage requirement which may be different from the voltage requirement of any other element can be supplied with power in an uninterrupted manner using a unit mounted on a single circuit board.

2. The backup power system defined in claim 1 wherein said voltage controlling means include switching power supplies.

3. The backup power supply system defined in claim 2 wherein said switching power supplies include a DC to AC converter.

4. The backup power supply system defined in claim 2 wherein said switching power supplies include an AC to DC converter.

5. The backup power system defined in claim 1 further including a first circuit element connecting the main power supply to said universal buss and a second circuit element connecting said backup power supply to said universal buss.

6. The backup power system defined in claim 5 wherein said backup power supply includes a battery.

7. The backup power system defined in claim 6 further including a battery charger connected to said battery.

8. The backup power supply system defined in claim 7 further including means for limiting a maximum charge current associated with said backup supply.

9. The backup power supply system defined in claim 8 wherein said charge current limiting means includes a resistor connected to said backup power supply means.

10. The backup power supply system defined in claim 8 in which said charge current limiting means includes two resistors and a diode connected between said backup power supply means and said universal buss.

11. The backup power supply system defined in claim 5 wherein said second circuit element includes a relay connecting said backup power supply means to said universal buss and a resistor connecting said universal buss to said backup power supply means.

12. The backup power system defined in claim 1 further including an indicator means connected to the backup power supply means to indicate the status of the backup supply.

13. The backup power supply system defined in claim 12 further including signal means in said indicator means for signalling when said backup power supply means is low or in danger of becoming exhausted.

14. The backup power supply system defined in claim 13 wherein said signal means includes a digital signal and said indicator means further includes means connected to said digital signal for triggering data storage in a computer connected to one of said output connection means.

15. The backup power supply defined in claim 12 further including a DC to AC converter 16. The backup power system defined in claim 1 further including spike and surge protection means connected to the main power supply.

17. The backup power supply defined in claim 1 wherein diodes are serially connected between said connection means and said universal buss and serially between said backup power supply and said universal buss.

18. The backup power supply system defined in claim 1 further including means on said board for including a remote power source into the backup power system and connecting said remote power source to said universal buss in the event power demand exceeds the amount of power which can be supplied be said backup power supply means.

19. The backup power supply system defined in claim 1 further including means to turn off said backup power supply means.

20. The backup power supply system defined in claim 19 wherein said means for turning off said backup power supply means includes a separate charger.

21. The backup power supply system defined in claim 1 further including a converter serially interposed between said power connection means and said universal buss.

22. The backup power supply system defined in claim 21 further including a first circuit element connecting the universal buss to said backup power supply means for conducting current from said universal buss to said backup power supply means and a second circuit element connecting said backup power supply means to said universal buss for conducting current from said backup power supply means to said universal buss, wherein said first circuit element includes a current limiting means for limiting the current flowing from said universal buss to said backup power supply means.

23. The backup power supply system defined in claim 22 wherein said first circuit element includes a diode serially connected between said univeresal buss and said backup power supply means.

24. The backup power supply system defined in claim 23 wherein said first circuit element further includes a resistor serially connected between said diode and said backup power supply means.

25. The backup power supply system defined in claim 22 wherein said first circuit element includes a resistor serially connecting said universal buss to said backup power supply means.

26. The backup power supply system defined in claim 25 wherein said second circuit element includes a diode serially connecting said backup power supply means to said universal buss.

* * * * *